United States Patent [19]

Yamamoto

[11] Patent Number: 5,432,621
[45] Date of Patent: Jul. 11, 1995

[54] IMAGE PROCESSING SYSTEM FOR ENLARGING AN REDUCING AND IMAGE

[75] Inventor: Makoto Yamamoto, Tokyo, Japan

[73] Assignee: Yozan Inc., Tokyo, Japan

[21] Appl. No.: 65,455

[22] Filed: May 21, 1993

[30] Foreign Application Priority Data

May 23, 1992 [JP] Japan .................. 4-155649

[51] Int. Cl.⁶ .............................................. H04N 1/40
[52] U.S. Cl. ..................................... 358/471; 358/448
[58] Field of Search ............... 358/448, 451, 463, 471, 358/482, 483, 525; H04N 1/40, 1/393; 382/31, 47; 395/139; 348/581

[56] References Cited

U.S. PATENT DOCUMENTS

| | | | |
|---|---|---|---|
| 4,587,621 | 5/1986 | DuVall | 358/451 |
| 4,672,463 | 6/1987 | Tomohisa et al. | 358/451 |
| 4,683,499 | 7/1987 | Kuwabara | 358/451 |
| 4,712,141 | 12/1987 | Tomohisa et al. | 358/483 |
| 4,776,031 | 10/1988 | Mita | |
| 4,899,226 | 2/1990 | Tanimoto et al. | 358/483 |
| 4,953,014 | 8/1990 | Takaragi | 358/451 |
| 5,003,193 | 3/1991 | Yatsuzuka | |
| 5,105,072 | 4/1992 | Saito et al. | |
| 5,208,874 | 5/1993 | Omura | 358/483 |

FOREIGN PATENT DOCUMENTS

| | | |
|---|---|---|
| 0440794 | 8/1991 | European Pat. Off. |
| 2676562 | 11/1992 | France |
| 3905619 | 8/1989 | Germany |
| 2211691 | 7/1989 | United Kingdom |

*Primary Examiner*—Edward L. Coles, Sr.
*Assistant Examiner*—Kim Yen Vu
*Attorney, Agent, or Firm*—Cushman, Darby & Cushman

[57] ABSTRACT

An image processing system having a first memory for storing image data in a multi-value format. The system converts the image data stored in the first memory into frequency component data, which is then stored in a second memory. The system can shift the frequency component data by a predetermined value. Finally, the system may convert the shifted frequency component data into modified image data which is representative of an enlarged or reduced image. The system may also remove frequency components from the frequency component data that are greater than or equal to a predetermined value. Finally, the system may also convert this noise-reduced frequency component data into noise-reduced image data.

4 Claims, 2 Drawing Sheets

IMAGE PROCESSING SYSTEM FOR ENLARGING AN REDUCING AND IMAGE

FIELD OF THE INVENTION

This invention relates to an image processing system, available for optical image processing in an image data processing system such as a copy machine, a facsimile, a scanner and so on.

BACKGROUND OF THE INVENTION

It is necessary to provide an image processing function to a copy machine etc., because in such image processing system usually needs functions of enlargement, diminishment and so forth, so a lot of optical systems are indispensable. The optical system had a contradictory subject to decrease aberration and to compact the size: it is difficult to compact a system in order to guarantee the quality of the processed image. Concerning to the optical technology, compactness and costdown is prevented by mechanical technological components such as adjustment of optical axis, cleaning of a surface for receiving light, controlling vibration, protecting friction in the movable part and so on.

SUMMARY OF THE INVENTION

This invention solves these conventional problems mentioned above and provides an image processing system possible to process the function being dependent on the optical system in an image data processing.

An Image Processing System according to the present invention once reserves an image data in a memory as a multivalue data and calculates frequency components of the data, and operates enlargement, diminishment and noise reduction in a frequency space.

PREFERRED EMBODIMENT OF THE PRESENT INVENTION

Hereinafter, an embodiment of an image processing system according to this invention is described with reference to the attached drawings.

Figure 1:
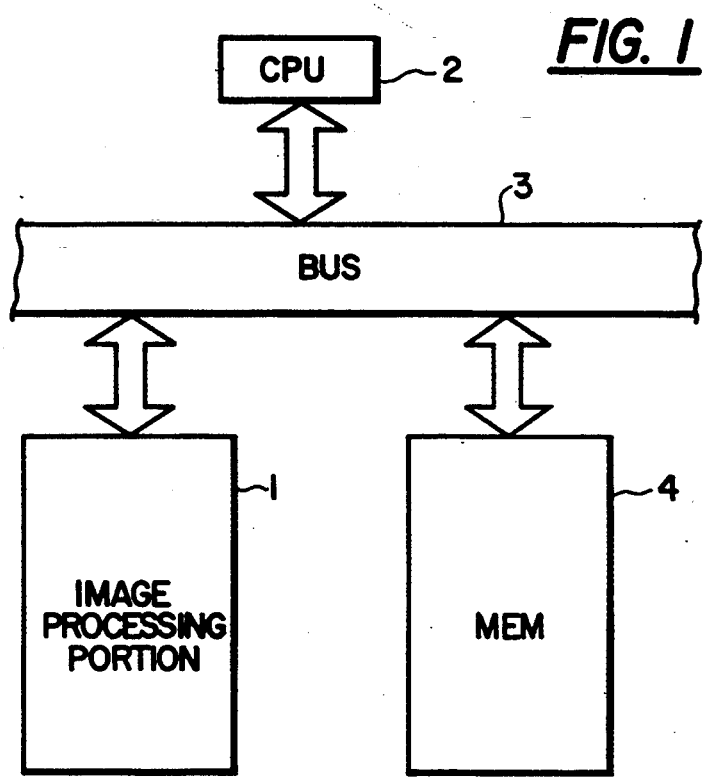
FIG. 1 is a diagram showing placement of an image processing system in the total system.

FIG. 1 shows a placement of an image processing system 1 in the total system: the system 1 is connected through a Bus 3 with a CPU 2 for controlling the total system. The BUS 3 is connected with Memory 4 for storing a plural number of input images, a plural number of pages of manuscripts, for example. When an image is once stored in Memory 4, a layout of a page and other editions are easily performed.

Figure 2:
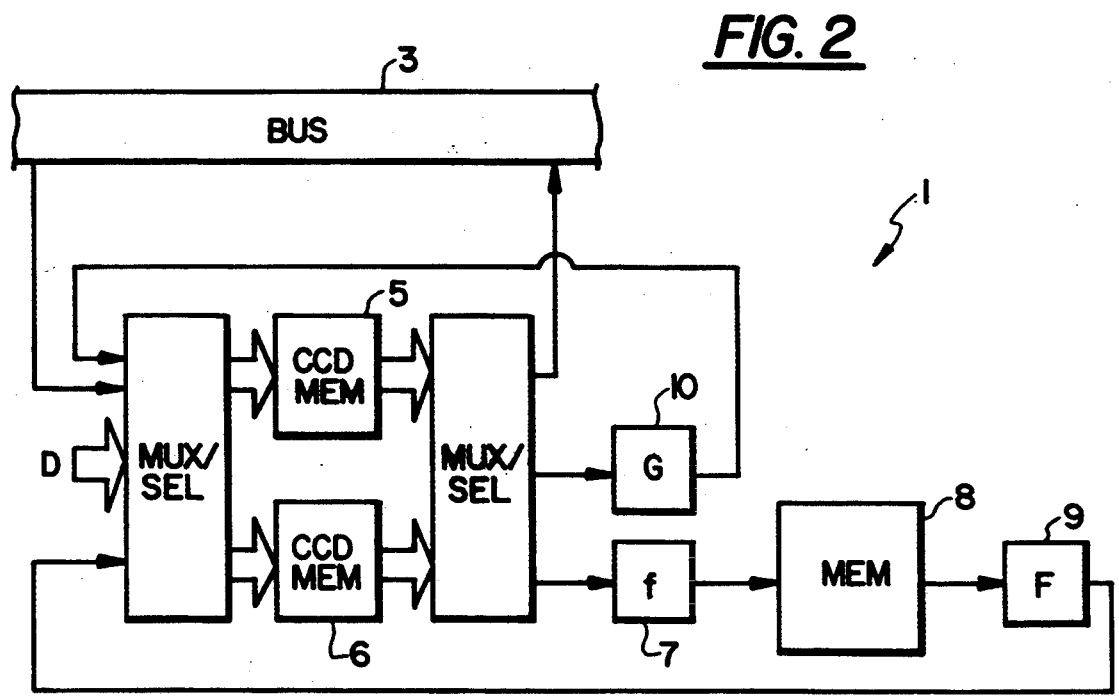
FIG. 2 is a diagram showing a composition of an image processing system.

A composition of the image processing system 1 is shown in FIG. 2: it inputs data "D" from an input system (not shown) into CCD Memory 5 or 6 and converts them into a frequency space by Fourier Transformation, etc. in the Frequency Analysis Means 7. Data converted into the frequency space is stored in Memory 8, and later it is contrary converted into an image space by the Converter Means 9.

Components of the frequency higher than $\frac{1}{2}$ of the sampling cycle of the input data "D" is deleted at first by the processing in the Converter Means 9. Since components of frequency higher than $\frac{1}{2}$ of sampling cycle has less meaning, they are judged as a noise in digital data.

When enlargement is performed by magnification "M", a frequency component of each frequency "f" is shifted into a frequency "f/M". As a result, a frequency component of an image enlarged by "M" times is obtained. Converting it inversely, an enlarged image is obtained.

On the other hand, in the diminishment of diminishing ratio of "m", a frequency component of each frequency "f" is shifted into a frequency of "f×m". As a result, a frequency component of an image diminished by "m" times is obtained. Converting it inversely, a diminished image is obtained. The inversely converted image is once fed back to CCD Memory 5 or 6, and it is transmitted to BUS 3. Providing 2 CCD memories, timing for feedback of an image is guaranteed, and also an image through processing is stored, with preserving the original image.

Furthermore, CCD Memories 5 and 6 are connected to Filter Circuit 10, and a smoothing with preserving edge is executed, for example, line process ("Computing Motion Using Analog and Binary Resistive Network", C. Koch, et al., Computer IEEE, March 1988). This processing is repeatedly performed for an image, therefore the output of the filter circuit is fed back to CCD Memory 5 or 6 and repeatedly processed in the Filter Circuit 10. The processing of Filter Circuit needs comparatively much processing time and it is important for it to guarantee the timing of feedback by composing one pair of CCD Memories.

Figure 3:
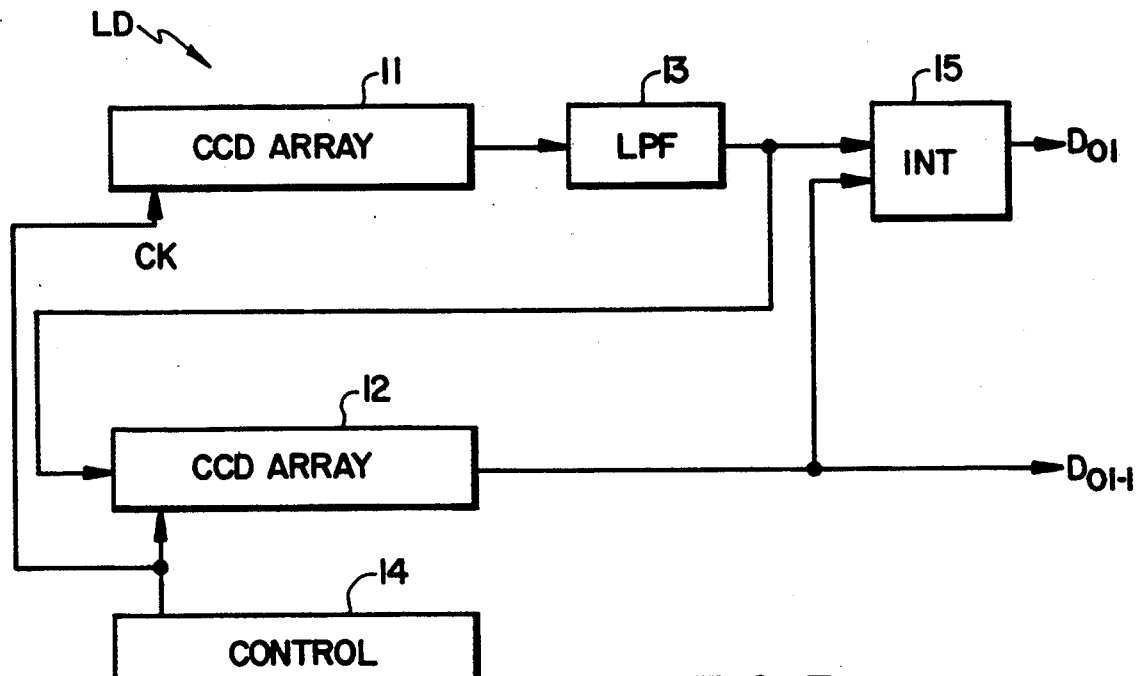
FIG. 3 is a diagram showing another composition for realizing enlargement and diminishment.

FIG. 3 shows another embodiment for realizing enlargement and diminishment. This embodiment receives an optical input LD at Line Sensor 11. Line Sensor 11 and Line Memory 12 consists of a CCD Array, and an output of CCD Array 11 is connected to Low Pass Filter 13. Data in the CCD Array is synchronously transmitted to Clock "CK", and the Clock "CK" is controlled in the Control Means 14. When a standard speed of Clock "CK" is "S", the speed is reduced to "S/M" in the case magnification is "M" and it is to be "S×M" in the case diminishing ratio is "m".

By this clock control, an image signal enlarged or diminished in the longitudinal direction is output, and smoothing data is given by Low Pass Filter 13 because the change of density of the image is steep when it is enlarged. An output of Low Pass Filter 13 is input into CCD Array 12, and it is output as an output "$D_{oi-1}$" of the (i−1)-th line from here.

The output of Law Pass Filter 13 and the output of Line Memory 12 are input into Interpolation Circuit 15, generate a line located in the middle of the lines of the original image on enlargement and perform interpolation. This interpolated line is output as an I-th output "$D_{oi}$".

It is possible to execute enlargement with very speedy interpolation because a signal for enlargement and diminishment is generated directly in the longitudinal direction from data of Line Sensor of an input system and interpolation between lines is performed consequently in synchronous speed with the transformation of data.

A conventional optical system is not necessary and it is helpful to realize big cost-down and compactness by performing noise reduction, enlargement and diminishment through the electric circuit mentioned above.

Figure 4:
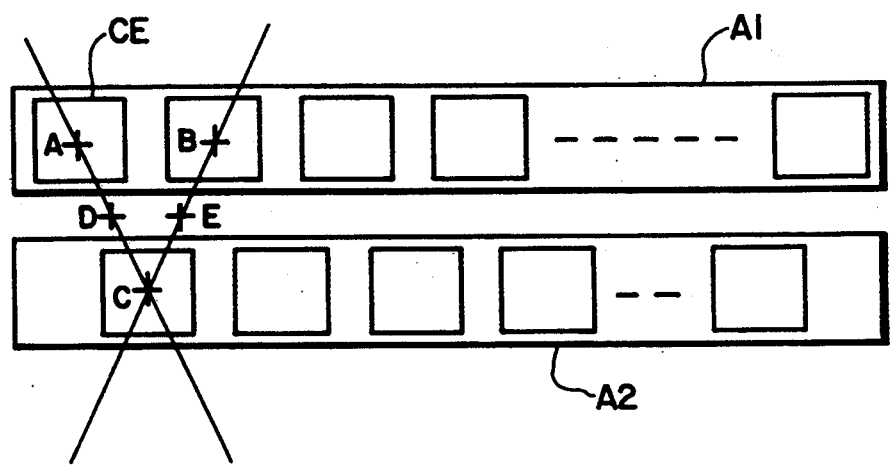
FIG. 4 is a diagram showing a composition establishing 2 lines of line sensor.

To enlarge and diminish an image in high quality by electrical circuit, it is better to improve the resolution of input data, 4 times resolution is obtained by establishing 2 Line Sensors (A1 and A2) according to a composition of FIG. 4.

Light Receiving component in Line Sensor "A2" is located in just middle of Light Receiving component "CE" of Line Sensor "A1". Resolution twice as conventional one can be obtained at the points of receiving light. (Each center is shown by the representative point "A", "B", and "C".) At the middle points "D" and "E" of "AC" and "BC" can calculate the Light Receiving density in good similarities and 4 times resolution can be substantially obtained.

As mentioned above, the image processing system according to the present invention once preserves an image data as a multivalue data, calculates the frequency component of the data, performs enlargement, diminishment and noise reduction in a frequency space, therefore it is possible to perform the function which has been dependent on the optical system in an image processing system.

What is claimed is:

1. An image processing system comprising:
   an electronic input system that is constructed and arranged to sense a physical object and to produce image data that is indicative of the sensed physical object;
   a first electronic memory for storing the image data produced by the electronic input system in a multi-value format;
   frequency converting means for converting the image data stored in the first electronic memory into frequency component data;
   a second electronic memory for storing the frequency component data; and
   converting means for shifting the frequency component data stored in the second electronic memory by a predetermined value and for converting the shifted frequency component data into modified image data which is representative of one of an enlargement in a size of the physical object or a reduction in the size of the physical object.

2. An image processing system according to claim 1, wherein the frequency converting means includes a Fourier transform circuit.

3. An image processing system comprising:
   an electronic input system that is constructed and arranged to sense a physical object and to produce image data that is indicative of the sensed physical object;
   a first electronic memory for storing the image data in a multi-value format;
   frequency converting means for converting the image data stored in the first electronic memory into frequency component data;
   a second electronic memory for storing the frequency component data; and
   converting means for removing frequency components from the frequency component data stored in the second electronic memory that are greater than or equal to a predetermined value, thereby producing noise-reduced frequency component data, and for converting the noise-reduced frequency component data into noise-reduced image data, which is indicative of the sensed physical object.

4. An image processing system according to claim 3, wherein the frequency converting means includes a Fourier transform circuit.

* * * * *